United States Patent [19]

Mollenkopf et al.

[11] 4,447,966

[45] May 15, 1984

[54] ROTARY DRUM

[75] Inventors: Hans Mollenkopf, Beckum; Jürgen Wurr; Reinhard Körting, both of Ennigerloh, all of Fed. Rep. of Germany

[73] Assignee: Krupp Polysius AG, Beckum, Fed. Rep. of Germany

[21] Appl. No.: 402,058

[22] Filed: Jul. 26, 1982

[30] Foreign Application Priority Data

Aug. 18, 1981 [DE] Fed. Rep. of Germany ....... 3132578

[51] Int. Cl.³ .............................................. F26B 11/02
[52] U.S. Cl. ........................................ 34/108; 403/24; 403/28; 74/447
[58] Field of Search .................... 366/220; 403/28, 29, 403/30, 24; 34/132, 108, 121; 74/447, 448

[56] References Cited

U.S. PATENT DOCUMENTS

| | | | |
|---|---|---|---|
| 2,999,396 | 9/1961 | Kaczmarski | 34/108 X |
| 3,247,601 | 4/1966 | Sims | 34/108 |
| 3,561,741 | 2/1971 | Richardson | 74/447 |
| 4,320,586 | 3/1982 | Korting | 34/108 |

*Primary Examiner*—Andrew V. Kundrat
*Attorney, Agent, or Firm*—Learman & McCulloch

[57] ABSTRACT

A rotary drum having a toothed rim arranged on the drum casing and supported at several peripheral points on the drum casing by evenly distributed bridge members. Each bridge member includes two clips axially spaced from one another and welded to the drum casing and a cross plate which connects the clips and is radially spaced from the drum casing. Each cross plate is rigidly connected to one clip and slideably connected in the axial direction to the other clip so that differing degrees of thermal expansion and resulting deformation of the cross plates and further strain on the cross plates, clips and connection points can be compensated for.

11 Claims, 6 Drawing Figures

//

ROTARY DRUM

BACKGROUND OF THE INVENTION

The invention relates to a rotary drum having a toothed rim which is arranged on the drum casing and supported at a number of points on the periphery of the drum casing by means of a bridge member which contains two axially spaced clips which are welded to the drum casing and a cross plate which connects the clips and is arranged radially distant from the drum casing.

A rotary drum of the type described can be constructed for various applications, such as a rotary dryer, mixing drum, tube mill, rotating cylinder for a rotary kiln, etc. Such a drum is driven by the toothed rim arranged on the drum casing, the teeth of the rim engaging with at least one drive gear.

In one known construction of the type described each cross plate of a bridge member has both ends welded onto the corresponding clip, whilst the toothed rim is supported on the central region of the cross plates and screwed in position there.

In rotary drums which are intended for heat treatment of any material placed inside them and are therefore heated from inside in any manner, the drum casing is necessarily heated during the heat treatment to a temperature which, because of the radial spacing of the toothed rim from the drum casing, is markedly higher than the temperature of the toothed rim. As the resulting radial thermal expansion of the drum casing is greater than that of the toothed rim, this can give rise to undesirable bowing and deformation of the cross plates which are fixed to the clips. However, it should be borne in mind that each cross plate is at a specific radial distance from the kiln casing and is not therefore so greatly heated as the drum casing, with the result that the drum casing expands more in the axial direction than does the cross plate. These differing degrees of thermal expansion lead to further strain on the cross plates, the clips and the welded connections.

SUMMARY OF THE INVENTION

The object of the invention is to provide a simple improvement particularly in the construction of the bridge members in a rotary drum of the type described in the introduction so that such members are not subjected to the undesirable deformation and bowing caused by thermal expansion.

This object is achieved according to the invention in that the cross plate is firmly connected to one clip (of the bridge member) and is connected to the other clip so as to be slideably movable in the axial direction. In the construction according to the invention the advantages of the known bridge members of the rotary drum are retained; that is to say, the heat transfer from the drum casing to the toothed rim is kept to a minimum by the construction of the cross plates which directly support the toothed rim and the selected radial spacing thereof, and the toothed rim is supported with a certain bending elasticity by the cross plates. In addition, the cross plates which are connected according to the invention to the associated clips are able to undergo an alteration in length under the effect of the heat without any substantial hindrance, so that the undesirable deformation and strain referred to above can be reliably avoided, particularly in the region of each bridge member. This improvement in the known bridge members can be achieved in a very simple manner.

THE DRAWINGS

These and other advantages and details of the invention are disclosed in the following description and in the drawings, in which.

DETAILED DESCRIPTION

Figure 1:
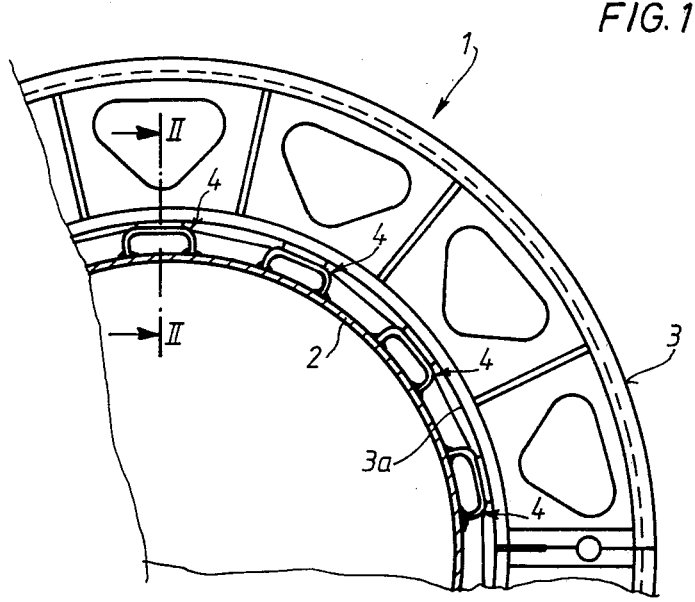
FIG. 1 is a partial cross-sectional view through a rotary drum in the region of a toothed rim arranged on the drum casing.

The rotary drum 1 shown in partial cross-section has a drum casing 2 on which a conventional toothed rim 3 is arranged in such a way that its inner periphery is radially spaced from the exterior of the drum casing 2.

The toothed rim 3 is supported at numerous peripheral points (with its inner periphery 3a) on the drum casing 2 by means of bridge members 4, the number of bridge members 4 for all the peripheral support points for the toothed rim 3 being evenly distributed over the periphery of the drum casing 2.

Figure 2:
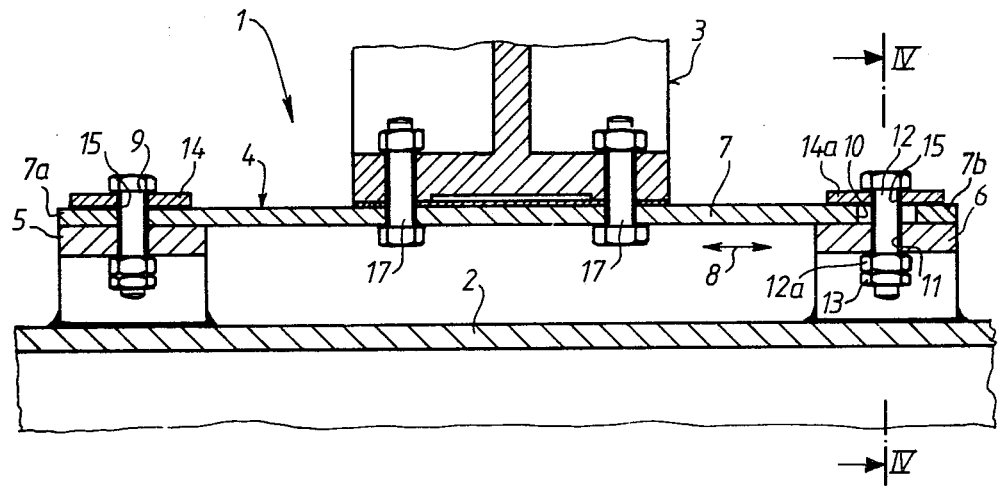
FIG. 2 is a detail of a sectional view (along the line II—II in FIG. 1) in the region of a bridge member.

Each bridge member 4 has two similarly-shaped clips 5, 6 welded or otherwise fixed to the drum casing 2 and arranged so that they are axially spaced from one another. A bridge or cross plate 7 connects the clips 5, 6 and is radially spaced from the drum casing 2. This cross plate 7 is arranged with its ends 7a and 7b on the associated clips 5 and 6 respectively and supports the toothed rim 3 in its central section (cf. FIG. 2).

To enable the cross plate 7 to accommodate the alterations in length referred to above (resulting from thermal expansion) substantially without hindrance (and thus without deformation and undesirable strain), the cross plate 7 is connected to the associated clips 5 and 6 respectively with its one end 7a fixed and its other end 7b slideably movable according to the double headed arrow 8 in the axial direction. The end 7a of the cross plate 7 is preferably firmly fixed by screws 9 to the associated clip, since this results in a particularly favourable assembly and dismantling facility. Obviously it is also possible for this fixed connection between the end 7a of the cross plate and the associated clip 5 to be produced by welding or riveting.

Figure 4:
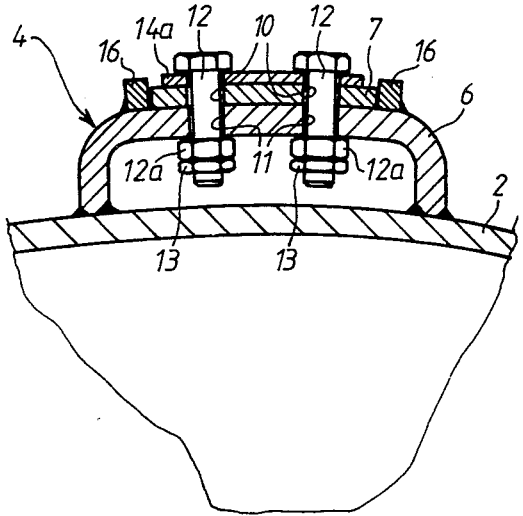
FIG. 4 is a sectional view through the bridge member along the line IV—IV in FIG. 2.

The other end 7b of the cross plate 7 is slideably connected to the associated clip 6 by means of a slot-screw connection which includes for each cross plate 7 at least two slots 10 which are spaced from each other and extend axially of the drum casing 2, the associated clip 6 being provided with two corresponding cylindrical holes 11 and the associated connecting screws 12. According to FIGS. 2 and 4 the nuts 12a of the connecting screws 12 are secured by lock nuts 13.

At the ends 7a, 7b of the cross plate 7 common plates 14 and 14a spanning the screw holes are associated with the respective screw connection and are also provided with cylindrical holes through which the corresponding connecting screws 9 and 12 respectively can also be passed.

Since the screw connections at the ends 7a, 7b of each cross plate 7 must transfer the total torque from the toothed rim 3, the corresponding screws 9 and 12 respectively are subject to severe strain. In order to avoid this it is necessary for each end 7a, 7b of the cross plates 7, viewed in the peripheral direction of the drum, to be supported on both lateral edges 7a', 7a'' and 7b', 7b'' by two abutments 16 also welded onto the corresponding clips 5 and 6. These abutments loosely contact the lateral edges of the cross plates 7 and are formed by relatively simple straight guide blocks aligned in the axial direction of the drum 2. This provides an additional extremely reliable support for the ends 7a, 7b of the cross plate in the peripheral direction of the drum without the sliding movability of the end 7b being restricted.

Figure 3:
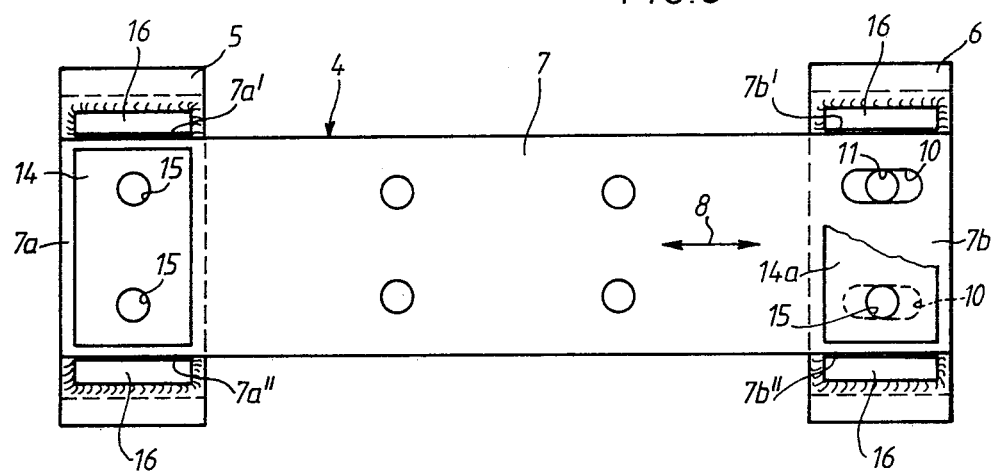
FIG. 3 is a plan view of the bridge member shown in FIG. 2.
Figure 5:
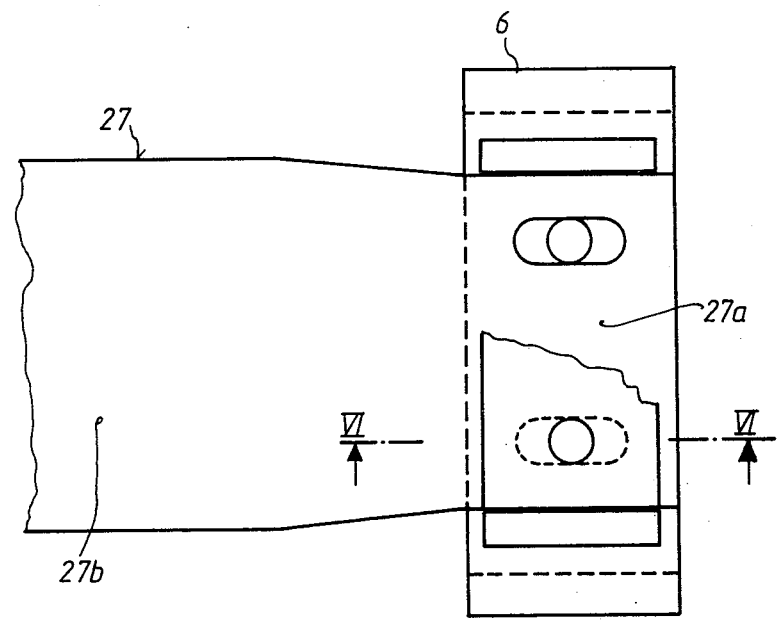
FIG. 5 is a partial plan view of a bridge member according to another somewhat modified embodiment.

Whereas in the embodiment described above each cross plate 7 has a substantially elongated rectangular shape in plan form (cf. FIG. 3), in a modification according to FIG. 5 each cross plate 27 can be of narrower construction in the region of its two ends (e.g. 27a) than in its central region (e.g. 27b). The clips (e.g. clip 6) supporting the ends and the screw connections in the region of the ends of the cross plate can otherwise be provided in the same form, as has been described in detail in connection with FIGS. 2 to 4.

Figure 6:
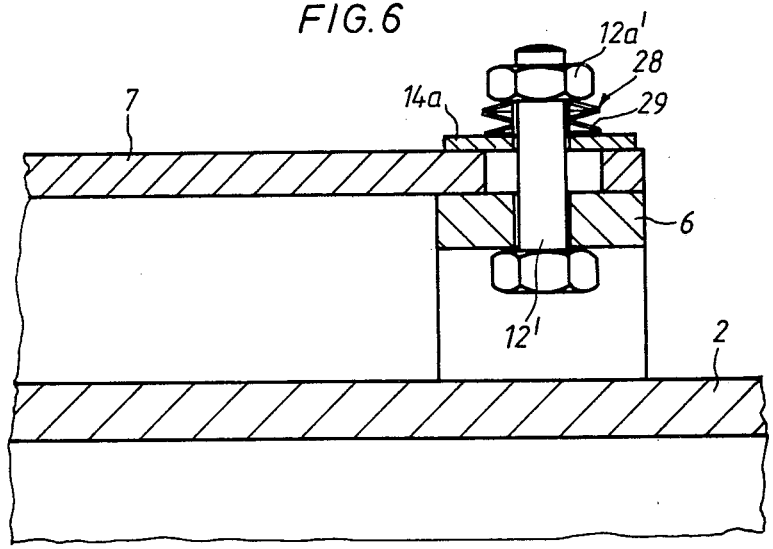
FIG. 6 is a partial sectional view along the line VI—VI in FIG. 5.

FIG. 6 shows in partial cross-section a further variant of the construction according to FIG. 5. This embodiment merely relates to the construction of the slot-screw connection 28, in which the connecting screw 12' for the cross plate 7 and the clip 6 is somewhat longer by comparison with the screw 12 in the example according to FIGS. 2 to 4 and a set of cup springs 29 is arranged between each nut 12a' and the associated plate 14a.

As has already been mentioned above, the toothed rim 3 is supported in each case by the central section (viewed axially to the drum casing 2) of the cross plate 7. The toothed rim 3 is firmly connected to the cross plates 7 by screws 17 (cf. FIG. 2).

In order to keep the strain on the cross plates 7 during bowing when the rotary drum is in the operational state as small as possible it is particularly advantageous when fixing the bridge members 4 (as set out above) on the drum casing 2 to ensure that when the drum casing 2 is in the cold state the cross plates 7 are prestressed against the toothed rim 3 by the expected amount (extent) of the radial operational thermal expansion in the radial direction. Using this method of fixing, the cross plates 7 are approximately straight when the rotary drum 1 or the casing 2 thereof reaches the normal operating temperature.

What is claimed is:

1. In a rotary drum having a toothed rim mounted on the drum and supported at a number of points on the periphery of the drum by means of a bridge member having two axially spaced clips fixed to the drum and a cross plate spanning the clips and radially spaced from the drum, the improvement wherein the cross plate is fixed to one clip and connected to the other clip for sliding movement relative thereto axially of said drum.

2. A rotary drum according to claim 1 wherein the sliding connection between each cross plate and the associated clip comprises a slot-screw connection.

3. A rotary drum according to claim 2 wherein for the slot-screw connection each cross plate includes at least two axially extending slots spaced from each other in the peripheral direction of the drum and two corresponding cylindrical holes and a screw extending through one of said slots and one of said holes.

4. A rotary drum according to claim 3 including cup springs associated with each connecting screw.

5. A rotary drum according to claim 3 wherein each connecting screw has a lock nut.

6. A rotary drum according to claim 1 wherein a common plate overlies the opposite ends of said cross plate.

7. A rotary drum according to claim 1 wherein each end of said cross plate is supported on both lateral edges by abutments fixed on the corresponding clip, the abutments being in loose contact with the said lateral edges of the cross plate.

8. A rotary drum according to claim 7 wherein the abutments for the cross plates are formed by straight guide blocks which are welded onto the corresponding clips and aligned in the axial direction of the drum.

9. A rotary drum according to claim 1 wherein the cross plate is narrower in construction in the region of its ends than in the central region.

10. A rotary drum according to claim 1 wherein the cross plate is of substantially uniform width throughout its length.

11. A rotary drum according to claim 1 wherein at its end opposite to the sliding connections each cross plate is rigidly fixed to the associated clip.

* * * * *